United States Patent [19]
Otto et al.

[11] Patent Number: 6,097,333
[45] Date of Patent: Aug. 1, 2000

[54] METHOD FOR RANGE MEASUREMENT AND CONTOUR DETECTION BY MEANS OF MICROWAVES

[75] Inventors: Johanngeorg Otto, Essingen; Marcus Lust, Aalen; Hilmar R. Mueller, Bellenberg; Stephan Hansmann, Ulm; Dieter Stock, Wain, all of Germany

[73] Assignee: Wieland-Werke AG, Ulm, Germany

[21] Appl. No.: 09/233,287

[22] Filed: Jan. 19, 1999

[30] Foreign Application Priority Data

Jan. 16, 1998 [DE] Germany ............... 198 01 511

[51] Int. Cl.⁷ .................. G01S 13/08; G01S 13/89
[52] U.S. Cl. .................. 342/118; 342/128; 342/130; 342/131; 342/132; 342/134; 342/176; 342/179; 342/190; 342/191
[58] Field of Search ............. 342/61–75, 81–118, 342/123, 124, 175, 189–197, 128, 25, 130, 131, 132, 134, 176, 179

[56] References Cited

U.S. PATENT DOCUMENTS

| | | |
|---|---|---|
| 4,517,566 | 5/1985 | Bryant et al. . |
| 5,455,587 | 10/1995 | Schneider .................. 342/62 |
| 5,574,463 | 11/1996 | Shirai et al. ............ 342/70 |
| 5,847,675 | 12/1998 | Poinsard .................. 342/81 |

FOREIGN PATENT DOCUMENTS

| | | |
|---|---|---|
| 2 129 290 | 1/1973 | Germany . |
| 38 30 992 | 3/1990 | Germany . |
| 43 42 288 | 6/1995 | Germany . |
| 92/14124 | 8/1992 | WIPO . |

OTHER PUBLICATIONS

94 GHz Three–Dimensional Imaging Radar Sensor for Autonomous Vehicles, by M. Lange and J. Detlefsen; May 1991 pp. 819–827.

Introduction to Radar Systems, by M. Skolnik; 1980 pp. 5–8 and 68–101.

The Osprey Preform Process, by R. Evans et al.; Powder Metallurgy 1985 vol. 28, No. 1; pp. 13–20.

Primary Examiner—Bernarr E. Gregory
Attorney, Agent, or Firm—Flynn, Thiel, Boutell & Tanis, P.C.

[57] ABSTRACT

A method provides for contactless measurement of the range between a transceiver unit for microwaves in the frequency band from 1 to 100 GHz and an object to be investigated using a pulse principle. The microwaves are focused onto the surface by an antenna to detect the contour of the object. In particular, the surface of a bolt produced using a spray compacting method can be detected.

19 Claims, 2 Drawing Sheets

METHOD FOR RANGE MEASUREMENT AND CONTOUR DETECTION BY MEANS OF MICROWAVES

FIELD OF THE INVENTION

The invention relates to a method for contactless range measurement using FM-CW (Frequency Modulated-Continuous Wave) or pulse wave measurement.

BACKGROUND OF THE INVENTION

The FM-CW principle is known, or the pulse principle are described in detail by Merril Skolnik in "Introduction to Radar Systems", McGraw-Hill, (1980), page 68 ff.

Range measurements of the this type have been used, for example, in measuring the altitude of aircraft over large distances (See, for example, German Patent Publication DE-C 3.830.992 "Aircraft Radar") and in the so-called very short range (0 to approximately 30 m) for liquid level measurements in process containers and storage tanks (See German Patent Publication DE-B 2 129 290 and PCT Publication WO 92/14 124).

A common feature of these applications is the difficulty of punctiform range measurements between the transceiver unit characteristic of the method and a so-called measuring spot or point on the surface of the objected to be measured. This measuring spot is very small in comparison with the transceiver antenna. The FM-CW principle has not been transferred to applications in which a comparatively small measuring spot is defined in order to carry out, for example, range measurements in relation to individual contour points on a non-flat surface of an object.

SUMMARY OF THE INVENTION

It is the object of the invention to extend the previous methods of range measurement in the very short range to the effect that they can be undertaken with sufficient measuring accuracy even on those objects which are located in an atmosphere containing dust and fog. It is a further object of the invention to be able to make range measurements of individual object points having sizes significantly smaller than the actual object on which the points are located.

The objects of this invention are achieved according to the invention by with the use of microwaves in the frequency band from 1 to 100 GHz. The microwaves are focused onto the surface of the object with the formation of a measuring spot (focus) with a diameter of approximately D=10 to 30 mm.

The selection of the frequency band takes account of the fact that the ability of the microwaves to penetrate fog or dust particles is essentially determined by the ratio of particle size to the wavelength of the radiation. The small measuring spot diameter required for the range measurements at individual object points is achieved by focusing the microwaves.

The focusing of the microwaves is in this case performed not at an "ideal" focal point, but on a larger region of a focused field (a measuring spot) have a diameter D that represents the minimum of a focusing tube lying on the beam axis, see FIG. 2. The 3-dB lines of field intensity of the beam are plotted diagrammatically as a function of the distance from the central axis. The focal length L corresponds in this case to the length of the beam path section in which the largest part of the radiated power is concentrated in a space arranged closely around the beam axis. As a result, the spacing of the 3-dB lines is only slightly larger than D.

According to the prior art, in microwave range measurement the antenna aperture and the emission characteristic of a horn antenna, for example, yield a divergent beam whose diameter corresponds at least to the antenna aperture. This means that it is impossible to realize measuring spot diameters in the desired range from 30 to 10 mm or less.

According to the prior art, there is no sense in focusing the microwaves for the purpose of range measurement, because different path lengths to the focus are produced for the individual component beams. The superimposition of the various component beams leads to interference which severely falsifies evaluation of the range. Nevertheless, it is possible to measure ranges accurately with focused beams if only small measuring spots or convex targets and only a spread of range adjacent to the ideal focus are sanctioned for the measurement.

A band of 75 to 95 GHz is preferred for the microwave frequency, and a range of D=10 to 20 mm for the diameter of the measuring spot.

According to a particular embodiment of the invention, the microwaves are focused by means of an ellipsoidal antenna or parabolic antenna. In one version of the invention, the microwaves are fed in at the first focal point of the ellipsoidal antenna and focused at the second focal point of the ellipsoidal antenna. Ellipsoids have the property, when considered in terms of geometrical optics, that beams issuing from one focal point are focused at the other focal point, the path length being the same for all beams.

The focusing of the microwaves onto the surface of the object already fixes the range between the transmitting unit and the surface of the object. Therefore, the suitable selection of an antenna aperture ensures that there is still adequate focusing in the event of certain changes in range which are at least as large as the fluctuations in the range to the objects which are actually to be expected.

An adequate resolution of the contour is achieved by the selection of the diameter of the measuring spot and the microwave frequency used.

In the case of different apertures in the range of 100 to 400 mm, the result for suitably dimensioned ellipsoidal antennas is 3-dB widths of the microwave beam of less than 30 mm inside focal lengths L of 300 to 1000 mm. For an aperture of 400 mm, the influence of a fault in different path lengths between the transmitter and measuring spot is approximately 0.1 mm when the measuring range is limited to the length L of the focusing tube.

The method according to the invention can be used not only for range measurement, but also to detect the contour of an object by deflecting, shifting, the position of the measuring spot or measuring point. The deflection is preferably performed by means of a pivoting or rotating mirror with a reflecting surface (metallic mirror or mirror with metalized surface). In accordance with a variant according to the invention, the contour is scanned by a plurality of microwave signals which are generated and received by plural transceiver units that are spaced apart from one another.

A preferred field of use of the method according to the invention is spray compacting. Here, the aim is to keep as constant as possible the diameter of the bolt to be produced. The spray compacting method itself is described in detail, for example, in the article: "The Osprey Preform Process" by R. W. Evans et al. in "Powder Metallurgy", Vol. 28 (1985), No.1, pages 13 to 20.

The subject matter of the invention is, furthermore, a device for carrying out the method according to the invention for range measurement.

The device is defined in that it comprises a transceiver unit for microwaves and an ellipsoidal antenna. The feed-in for the microwaves is arranged at the first focal point of the ellipsoidal antenna. The second focal point is assigned to the surface of the object to be investigated.

The aperture of the ellipsoidal antenna is preferably 100 to 400 mm.

The deflection of the microwave beam is performed by virtue of the fact that a rotating mirror with a reflecting surface is arranged in the middle between the feed-in of the microwaves and the surface of the object.

BRIEF DESCRIPTION OF THE DRAWINGS

The invention is explained in more detail with the aid of the following exemplary embodiment. In the drawings.

DETAILED DESCRIPTION

In the spray compacting process, optical methods, are suitable only given good viewing conditions, which are seldom present. The method according to the invention makes it possible to monitor the developing contour of the bolt of metal being spray formed in the event of unfavorable viewing conditions in the spray chamber due to overspray, zinc vapors. Knowledge of the contour of the bolt during the spraying process is mandatory for setting the parameters of the spray compacting process.

Figure 1:
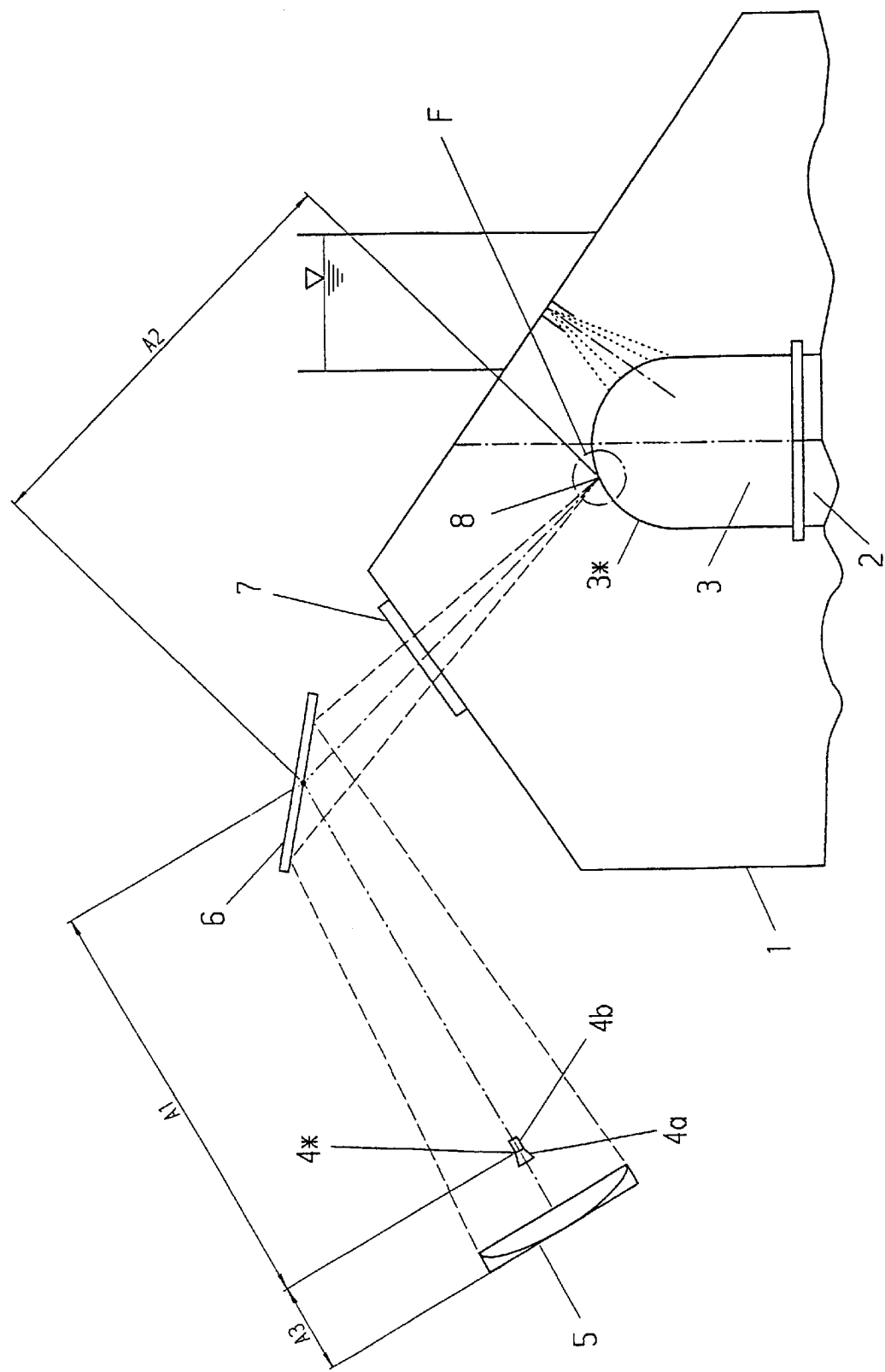
FIG. 1 shows the application of the method according to the invention to the spray compacting process.
Figure 2:
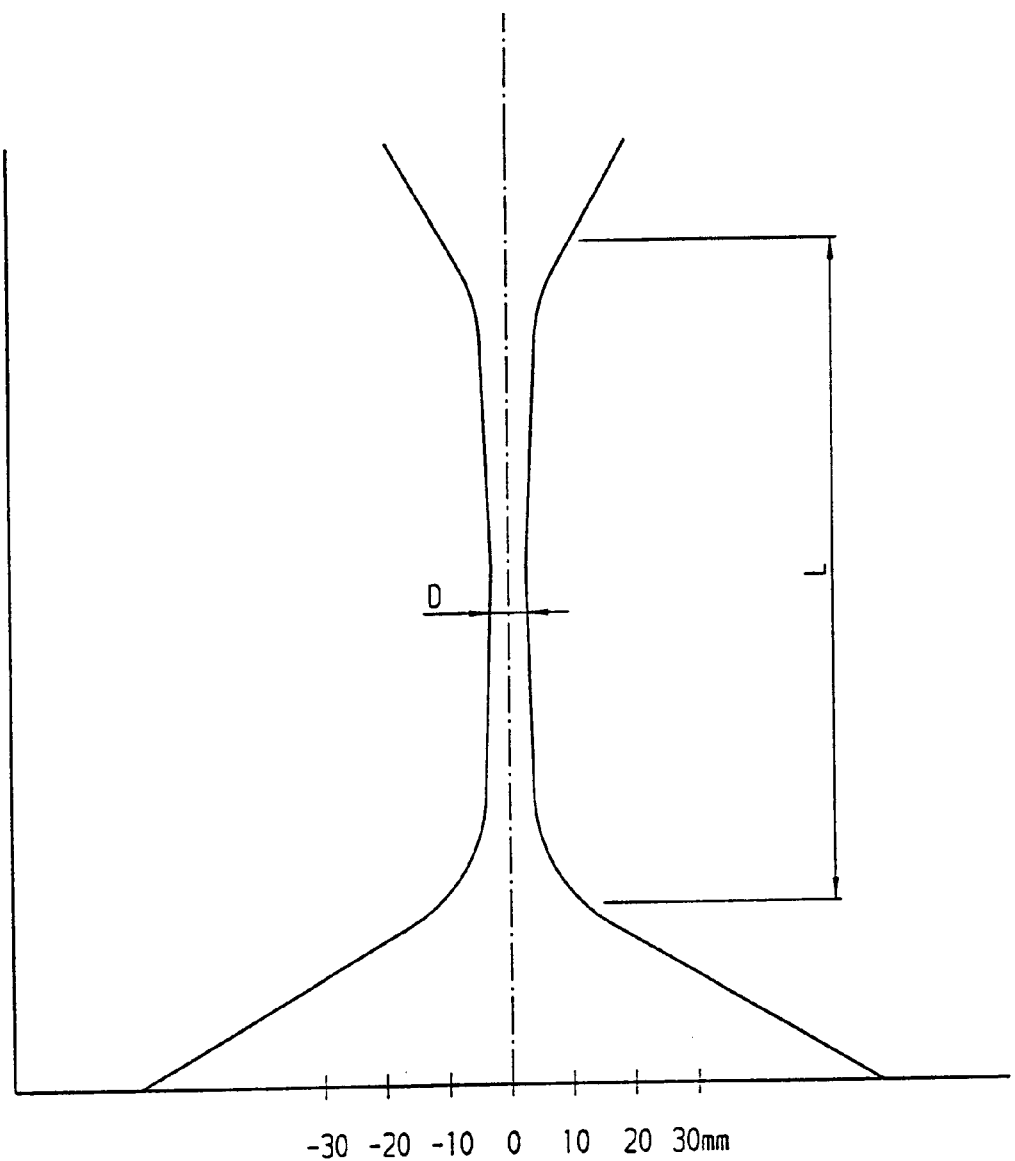
FIG. 2 shows the focusing of the microwave beam as the detail area F to FIG. 1.

FIG. 1 shows diagrammatically a vertical section through a spray chamber 1 and the assigned measuring device. A bolt 3 with a diameter of approximately 300 to 400 mm is produced in the spray chamber 1 on a rotary plate 2.

The measuring device comprises a commercial transceiver unit 4a, 4b (a known assembly) for microwaves, and an ellipsoidal antenna 5. A frequency of 94 GHz was selected (wavelength $\lambda$=3.2 mm). With a size of the metal particles in the region of approximately 50 $\mu$m, this results in a favorable ratio of particle size to wavelength.

The feed-in point 4* of the transmitter 4a is arranged at the first focal point of the ellipsoidal antenna 5 (aperture: 250 mm). The microwaves are reflected off a metallic rotating mirror 6, pass through a window 7 which is transparent to microwaves, and are focused at the second focal point of the ellipsoidal antenna 5 on the bolt surface 3*. The distance of the focal points from the rotating mirror 6 was, in each case, $A_1$=$A_2$=700 mm. The distance of the feed-in point 4* from the vertex of the antenna 5 was: $A_3$+100 mm. A measuring spot or location 8 with a diameter D=25 mm was established. The deflection of the measuring spot 8, the shifting of the measuring spot, in a region of approximately 10 mm was performed by rotating the mirror 6.

The evaluation of the microwave signals, and the further data processing for controlling the bolt diameter are not the subject matter of the invention.

In the case of the use of a metallic rotating mirror 6, the reflected microwave beam can be directed, given a 90° rotation of the mirror 6 relative to the central axis, onto the receiver 4b, the position of which is known. It is possible in this way for the accuracy of the microwave range measurement to be checked and calibrated at any time. Since the characteristic of FM-CW sensors can vary in the event of temperature variations or due to aging, such a possibility of correction is sensible and necessary.

The embodiments of the invention in which an exclusive property or privilege is claimed are defined as follows:

1. A method for determining a contour of a surface of an object, by performing contactless measurement of the object, including the steps of:

providing a transceiver unit for transmitting and receiving microwaves relected by the object for sensing range measurements;

generating microwaves with the transceiver unit, the generated microwaves being in the frequency band from 1 to 100 GHz and directing the microwaves towards the surface of the object;

feeding the microwaves in at a first focal point of an ellipsoidal antenna, the antenna focusing the microwaves onto a surface of the object at a second focal point of the antenna comprising a measuring spot on the surface of the object having a diameter between 10 and 30 mm to sense a range measurement at the measuring spot; and shifting the microwaves to another measuring spot.

2. The method as claimed in claim 1, in which the measuring spot on the surface of the object is shifted by means of a rotating mirror with a reflecting surface on both sides.

3. The method as claimed in claim 1, in which the measuring spot on the surface of the object is deflected by means of a rotating mirror with a reflecting surface.

4. The method of claim 1, wherein plural transceiver units are provided that are spaced apart from each other and plural range measurements to the surface of the object are sensed by the plural transceiver units, wherein each said transceiver unit senses a range measurement at a different measuring spot on the surface of the object.

5. The, method as claimed in claim 1, wherein the object being measured is a bolt that is being formed using the spray contacting method.

6. The method as claimed in claim 1, wherein the frequency band of the microwaves is from 75 to 95 Ghz.

7. The method as claimed in claim 1, wherein the diameter of the measuring spot is from D=10 to 20 mm.

8. A device for making contour measurements of an object comprising:

a transceiver unit for generating and receiving microwaves;

an ellipsoidal antenna for receiving the microwaves and a feed-in point for the microwaves being positioned at a first focal point of the ellipsoidal antenna; and a second focal point of the antenna being positioned at the surface of the object to be investigated.

9. The device as claimed in claim 8, wherein an aperture of the ellipsoidal antenna is from 100 to 400 mm.

10. The device as claimed in claim 8, including a rotating mirror with a reflecting surface disposed between the feed-in point of the microwaves and the surface of the object.

11. The device as claimed in claim 8, wherein the measuring system includes an invariable test distance for self-calibration of the measuring system.

12. The device as claimed in claim 11, wherein a distance $A_1$ between the mirror and the first focal point of the ellipsoidal antenna is selected as the invariable test distance.

13. A method for determining a contour of a surface of an object, by performing contactless measurement of the object, including the steps of:

positioning a transmitter at a first focal point of an ellipsoidal antenna;

transmitting microwaves from the transmitter;

reflecting the microwaves using the ellipsoidal antenna and focusing the microwaves using the antenna at a second focal point of the antenna corresponding to a first measuring point on the surface of the object, the first measuring point having a diameter of less than 30 mm to sense a range measurement;

receiving microwaves reflected from the first measuring point to provide the range measurement at the measuring point; and shifting the microwaves to another measuring point for determining the contour at the surface of the object.

14. The method for determining the contour of the surface of the object of claim 13, including shifting the measuring point using a rotating mirror with a reflecting surface.

15. The method for determining the contour of the surface of the object of claim 13, including receiving the microwaves reflected from the second measuring point to provide, in combination with the microwaves reflected from the first measuring point, the contour at the surface of the object.

16. The method for determining the contour of the surface of the object of claim 15, including shifting the measuring point on the surface of the object and receiving reflected microwaves at a plurality of measuring spots on the surface of the object to define the contour at the surface of the object.

17. The method for determining the contour of the object of claim 13, including transmitting microwaves in a frequency band between 75 and 95 GHz.

18. The method for determining the contour of the object of claim 13, including receiving the microwaves from the ellipsoidal antenna and reflecting the microwaves toward the surface of the object using a mirror.

19. The method for determining the contour of the object of claim 18, including passing the microwaves reflected by the mirror through a window and into a spray chamber housing the object.

* * * * *

UNITED STATES PATENT AND TRADEMARK OFFICE
CERTIFICATE OF CORRECTION

PATENT NO. : 6,097,333
DATED : August 1, 2000
INVENTOR(S) : Johanngeorg Otto et al It is certified that error appears in the above-identified patent and that said Letters Patent is hereby corrected as shown below:

<u>Column 6,</u>
Line 4, change "at" to -- from-- ; and
change "spots" to -- points --.

Signed and Sealed this

Thirteenth Day of November, 2001

*Attest:*

NICHOLAS P. GODICI
*Attesting Officer*     *Acting Director of the United States Patent and Trademark Office*